United States Patent [19]
Onoki et al.

[11] 4,076,863
[45] Feb. 28, 1978

[54] PROCESS FOR CUTTING AND EDGING CHEMICALLY PRE-STRENGTHENED FINISHED UNCUT LENS BLANKS WITHOUT LOSS OF IMPACT RESISTANCE

[75] Inventors: Fumio Onoki, Tokorozawa; Kazuo Namiki, Tokyo; Tetsuo Osora, Fussa, all of Japan

[73] Assignee: Hoya Lens Corporation, Tokyo, Japan

[21] Appl. No.: 719,720

[22] Filed: Sep. 2, 1976

[30] Foreign Application Priority Data

Feb. 23, 1976 Japan ................................ 51-18630

[51] Int. Cl.$^2$ .......................... G02B 1/10; B05D 3/02; B05D 1/38; B05D 5/06
[52] U.S. Cl. .................................... 427/165; 428/80; 428/81
[58] Field of Search ................. 427/164, 165; 428/80, 428/81

[56] References Cited

U.S. PATENT DOCUMENTS 1,507,327  9/1924  Wrighton .......................... 427/164

Primary Examiner—James R. Hoffman
Attorney, Agent, or Firm—Stephen P. Gilbert

[57] ABSTRACT

The decrease in the impact resistance of the chemically pre-strengthened finished ophthalmic lens blanks due to the subsequent cutting and edging process can be prevented by coating the edge with at least one material selected from epoxy resins, alkyd resins, polyurethane resins, unsaturated polyester resins, acrylic resins or cyanoacrylates, polymerization of which can be completed by heating at a temperature of up to 200° C, by single coating, overlap coating or multiple-layer coating, and then polymerizing the edge coating or coatings to form a polymeric film. Also, if a black pigment is added to any of the starting material compositions for said resins, internal reflections from the lens and the resulting myopic rings around the periphery of the lens can also be reduced.

8 Claims, No Drawings

PROCESS FOR CUTTING AND EDGING CHEMICALLY PRE-STRENGTHENED FINISHED UNCUT LENS BLANKS WITHOUT LOSS OF IMPACT RESISTANCE

The present invention relates to a process for preventing a significant decrease in the drop-ball impact resistance of chemically pre-strengthened finished ophthalmic lens blanks due to the subsequent cutting and edging process.

Further, the invention pertains to a process for preventing a decrease in the impact resistance of chemically pre-strengthened finished ophthalmic lens blanks due to the subsequent cutting and edging process and, simultaneously, reducing internal light reflections from the lens edge and the resulting appearance of myopic rings around the lens periphery.

In general, chemical strengthening of ophthalmic lenses is accomplished by immersing a lens containing an alkali metal oxide in a bath of a molten salt of an alkali metal other than the alkali metal contained in the glass material of the lens. The temperature of the molten salt bath is usually near the transition temperature of the glass in order to exchange the alkali metal ions of the glass lens material with the alkali metal ions in the treating bath. The ion exchange produces on the lens surface a layer containing alkali metal ions other than those originally contained in the glass material of the lens, said layer having a thickness ranging from scores of microns to hundreds of microns. A difference in thermal expansion coefficient between the body of the lens and the ion exchange surface layer occurs. When the treated lens is cooled to room temperature, a compression layer is formed on the surface of the lens due to the difference in thermal expansion coefficient. The difference increases the bending strength, impact resistance, etc. of the lens.

If a crack penetrates through the compression layer on the lens surface, however, the impact resistance of the lens is reduced to its impact resistance prior to chemical strengthening. Impact resistant ophthalmic lens is in great demand for reasons of eye protection. However, ophthalmic lenses are produced at a factory by surfacing a lens blank to the required curvature and then supplied to an optician who cuts and edges the lens to the required shape before glazing the lens into a frame. As long as ophthalmic lenses are processed by such steps, the strengthening process must necessarily be carried out after the cutting and edging process as the cutting and edging of lens blanks chemically strengthened at the factory nullify the increased impact resistance imparted by the chemical strengthening process.

Cutting and edging of finished lens blanks is generally done by the optician. However, chemical strengthening of ophthalmic lenses by the process described above in the optician's workshop presents problems as the molten salt of an alkali metal at a temperature of around 500° C is difficult to handle. Moreover, only a limited number of lenses can be processed at a time.

As a result of various studies carried out to solve these problems, the present process has been developed by the present inventors. Thus, it has been found, as claimed in the present invention, that it is possible not only to prevent the said decrease in impact resistance but also to reduce the myopic rings which are seen in strong minus lenses.

As also claimed in the present invention, a process is provided for preventing the decrease in the impact resistance of a chemically pre-strengthened finished ophthalmic lens blank, caused by the subsequent cutting and edging process, by coating the edge surfaces of the lens, which has been edged after chemical strengthening, with at least one of the starting material compositions for resins such as epoxy resins, alkyd resins, polyurethane resins, unsaturated polyester resins, acrylic resins and cyanoacrylates, the polymerization of which can be completed at a temperature of up to 200° C, by the application of either single coating, overlap coating or multiple-layer coating and then polymerizing the resulting edge coating or coatings to form a polymeric edge coating or coatings. Further, the present invention provides a process for preventing a decrease in the impact resistance of lenses, while, simultaneously, reducing internal reflections from the lens edge and the resulting myopic rings around the lens periphery by adding a black pigment to any of the said starting material compositions for the resins to form a black polymeric edge coating or black polymeric edge coatings.

Thus, chemically pre-strengthened lens blanks are cut, edged and beveled. The edge is then polished with a buffer or a sponge wheel (for example, a PVA buffing wheel) to remove any fine cracks that may be formed on or in the edge surface. In order to eliminate the microcracks in the lens edge caused by the edging and polishing and to prevent a decrease in the impact resistance, the lenses are subjected to an edge processing in which a coating of a starting material composition for the resins is formed on the polished edge surface, which is then heated to a temperature of up to 200° C for 2 hours or less to complete polymerization and to cure the edge coating. The said decrease in the impact resistance can thus be prevented.

It is generally known that the moisture in the air penetrates into a crack and causes the crack to enlarge. This may result in eventual fracture of the lens. When a polymer coating is formed on the edge surface as claimed in the invention, said edged and polished edge surface is sealed off from the moisture in the air. Therefore, the enlargement of a crack can be prevented not only by the adhesion effect of the polymer edge coating but also by its sealing of the crack against moisture penetration. Moreover, the myopic rings commonly seen in thick edged high minus power lenses can be prevented as claimed in the present invention.

When a lens blank with a thick edge is edged and polished for insertion in a frame, a substantial amount of incident light falling on the edge of the lens is transmitted, but part of the light is reflected from the surface of the edge, is further reflected from the back surface (concave) of the lens, and finally leaves the front surface (convex) of the lens. Part of the light is also reflected from the front surface of the lens. Thus, part of the light is repeatedly internally reflected from the front and back surfaces of the lens. Thus, when the lens is observed from the front, myopic rings appear on the surface of the lens. This is cosmetically undesirable for a wearer of high minus lenses. Attempts have been made to reduce such myopic rings by blackening the lens edge with, for example, a paint or ink. However, inks, paints and varnishes are unsatisfactory from the standpoint of durability as their adhesion to glass is weak. Therefore, they tend to peel or scale off easily. On the other hand, if the edged and polished surface is coated with a starting material composition for a resin containing a black pigment and is then heated to polymerize and cure the coating, as claimed in the present invention, the coating is firmly bonded to the glass and the decrease in impact resistance which occurs through the cutting and edging of chemically pre-strengthened lens blanks can be prevented and the myopic rings seen in high minus lenses can be reduced.

The resins which may be used in the present invention must satisfy the following conditions:
1. They must be strongly adhesive to glass.
2. They must have low permeability to water or water vapor.
3. They must polymerize rapidly at low temperatures.
4. The resin coating itself must be durable.

Various studies made by the present inventors have demonstrated that epoxy resins, alkyd resins, polyurethane resins, unsaturated polyester resins, acrylic resins, cyanoacrylates and a mixture thereof can be preferably used in the present invention.

The results obtained by coating a starting material composition for a resin which does or does not contain a black pigment, such as carbon black, onto an edged and polished lens edge surface in a thickness of at least 10 $\mu$, and preferably 100 $\mu$, heating the coating to a temperature of up to 200° C to complete the polymerization, and then subjecting the lens to a drop-ball impact test, are illustrated referring to the following examples in which all parts and % are expressed by weight, unless otherwise indicated.

EXAMPLE 1

The lens blanks for chemical strengthening, as shown in Example 1 of the Japanese Patent Publication No. 1949/72, were processed into finished lens blanks having a diameter of 60 mm and a thickness of 2 mm and then immersed in a bath of molten $NaNO_3$ at 360° C for 15 minutes to strengthen impact resistance through the ion exchange process. The lenses thus chemically strengthened were cut and edged into shaped lenses with a diameter of 50 mm. A mixture of 100 parts of a starting material composition for an epoxy resin (diglycidyl ether of bisphenol A) and 13 parts of a curing agent (diethylenetetramine) was coated onto the processed lens edge surfaces in a thickness of 100 $\mu$. The edge coatings were then heated at 100° C for 30 minutes to polymerize and cure the edge coatings. When the lenses so processed were subjected to the drop-ball impact test in accordance with the FDA specifications, none of the lenses tested fractured.

| Edge treatment of lenses | Percentage of breakage |
|---|---|
| Edge uncoated | 20 |
| Edge coated | 0 |

EXAMPLE 2

The same chemically strengthened glass lenses as those used in Example 1 were processed in the same manner as in Example 1. A mixture of 100 parts of the same starting material composition for the epoxy resin as that used in Example 1, 80 parts of a curing agent (hexahydrophthalic anhydride) and 50% of a black pigment (carbon black powder having particle sizes of 5 to 20 $\mu$), based on the total weight of the starting material composition for the epoxy resin and the curing agent, was coated onto the lens edges in the same manner as in Example 1. The coatings were then heated at 200° C for 1 hour to polymerize and cure the coatings. When the lens samples thus obtained were subjected to the drop-ball impact test, none of the lenses fractured. It was also found by visual inspection that the internal reflection of light in the lenses and the resulting myopic rings were markedly reduced.

EXAMPLE 3

The same chemically strengthened glass lenses as those used in Example 1 were processed in the same manner as in Example 1. A mixture of 100 parts of a mixture obtained by mixing 100 parts of the same starting material composition for the epoxy resin as that used in Example 1 with 13 parts of diethylenetetramine and 5 parts of hydroxypropyl dimethacrylate were coated onto the edge in a thickness of 100 $\mu$. The coatings were then heated at 100° C for 1 hour to polymerize and cure the coatings. The coatings thus obtained were found to be highly adhesive to glass. When the lens samples were subjected to the drop-ball impact test, the lenses did not fracture.

EXAMPLE 4

The same chemically strengthened glass lenses as those used in Example 1 were edged in the same manner as in Example 1. The same starting material composition for the epoxy resin as that used in Example 1 was used to coat the lens edges in the same manner as in Example 1, and the coatings were then cured. A liquid composition consisting of 98 parts of methyl methacrylate, 2 parts of ethylene glycol dimethacrylate and 2 parts of benzoin methyl ether was further coated onto the edge coatings, and the coatings were then irradiated with a high voltage mercury lamp in a nitrogen gas atmosphere. The coatings thus obtained had a high gloss. In the drop-ball impact test, the lenses did not fracture.

EXAMPLES 5 – 9

The starting material compositions for resins as shown in the following table were respectively coated onto the same chemically strengthened lenses as those used in Example 1. The coatings were then cured. The lenses thus obtained were subjected to the drop-ball impact test. None of the lenses fractured.

Table

| Example No. | Type of resin | Composition of starting material composition (Parts) | | Curing conditions |
|---|---|---|---|---|
| 5 | Alkyd | A mixture consisting of 20 % of glycerol, 12 % of phthalic anhydride and 68 % of linseed oil fatty acid | 100 | One hour at room temperature |
| | | Mineral spirits | 50 | |
| | | Cobalt naphthenate | 0.5 | |
| | | Lead naphthenate | 0.5 | |
| 6 | Polyurethane | A mixture consisting of 2 moles of toluene diisocyanate and 1 mole of polyethylene glycol 400 | 100 | Standing at roon temperature for 20 minutes, then heating at 100° C for 40 minutes |
| | | Benzene | 50 | |
| | | N-Methylformamide | 2.5 | |
| 7 | Unsaturated polyester | Maleic anhydride | 18 | 30 Minutes at 100° C |
| | | Phthalic anhydride | 28 | |
| | | Styrene | 30 | |
| | | Propylene glycol | 31 | |
| | | Catechol | 0.02 | |
| 8 | Thermosetting acrylic | Hydroxyethyl methacrylate | 50 | Standing at 50° C for 2 hours, then heating at |
| | | Methyl methacrylate | 25 | |
| | | Butyl methacrylate | 20 | |
| | | Ethylene glycol | | |

Table-continued

| Example No. | Type of resin | Composition of starting material composition (Parts) | | Curing conditions |
| --- | --- | --- | --- | --- |
| 9 | Cyano-acry-lates | dimethacrylate<br>Benzoyl peroxide<br>α-Cyanoacrylates | 5<br>1 | 100° C for 2 hours<br>2 Hours at room temperature |

EXAMPLE 10

Various black polymeric coatings were formed by adding 20%, 30%, 40% and 50% of carbon black powder, having particle sizes of 5 to 20 $\mu$, to the starting material compositions for the resins as used in Examples 5 to 9, respectively. All of the lens samples thus obtained successfully passed the drop-ball impact tests and did not show myopic rings.

As described above, a decrease in the impact resistance of the chemically strengthened finished ophthalmic lens blanks due to the cutting and edging process can be prevented by coating, onto the edged surface of the lens edge, a starting material composition for the resins, a curing agent and, optionally, a black pigment in a thickness of at least 10 $\mu$, and preferably 100 $\mu$, and heating the resulting coating to a temperature of up to 200° C to form a polymerized and cured edge coating, as claimed in the present invention. Therefore, it is possible to chemically strengthen finished ophthalmic lens blanks in quantities for subsequent cutting and edging without loss of impact resistance. Further, a durable black coating is formed on the lens edge which decreases internal reflection within the lenses. Thus, cosmetically pleasing lenses with greatly reduced myopic rings can be obtained even with high minus powers.

What is claimed is:

1. A process for preventing a decrease in the impact resistance of chemically strengthened ophthalmic glass lens blanks after a cutting and edging process, which comprises coating the surface of the lens edge with one or more coatings of at least one of the starting material compositions for epoxy resins, alkyd resins, polyurethane resins, unsaturated polyester resins, acrylic resins, or cyanoacrylates, and then polymerizing the resulting edge coating or coatings at a temperature of up to 200° C to form a polymeric edge coating.

2. A process according to claim 1, wherein a black pigment is added to at least one of the said starting material compositions for the resins.

3. A process according to claim 2 wherein the said edge coating or coatings have a total thickness of at least 10$\mu$.

4. A process according to claim 2 wherein a curing agent is further added to at least one of the said starting material compositions for the resins.

5. A process according to claim 4 wherein the said edge coating or coatings have a total thickness of at least 10$\mu$.

6. A process according to claim 1, wherein a curing agent is further added to at least one of the said starting material compositions for the resins.

7. A process according to claim 6 wherein the said edge coating or coatings have a total thickness of at least 10$\mu$.

8. A process according to claim 1 wherein the said edge coating or coatings have a total thickness of at least 10$\mu$.

* * * * *